May 14, 1940.                    H. W. STRUCK                    2,200,973
                        DEVICE FOR OPERATING VEHICLE CONTROLS
                                Filed June 3, 1938
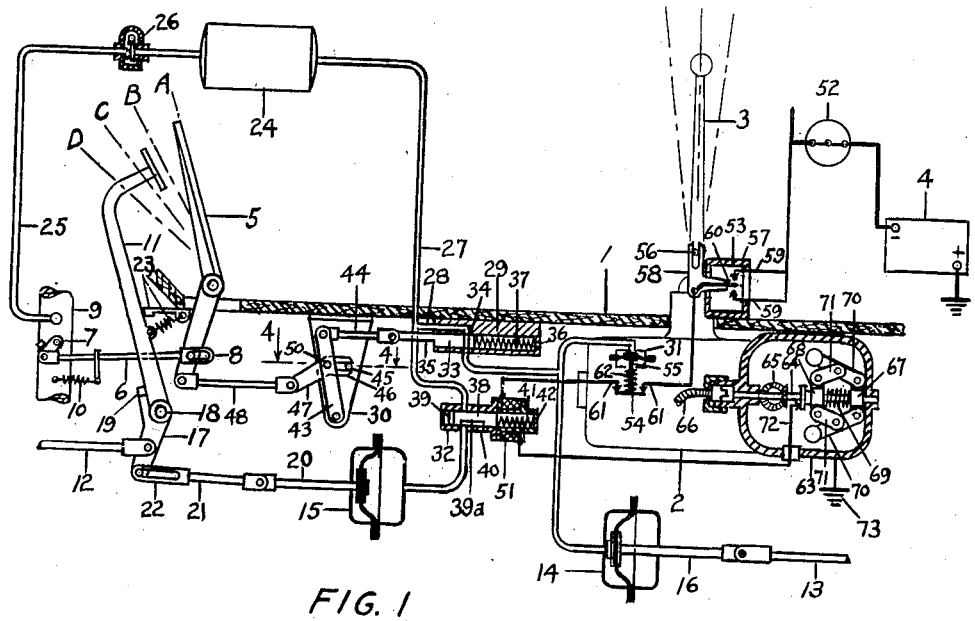
FIG. 1
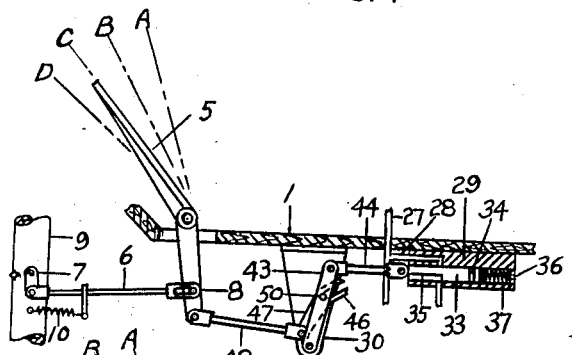
FIG. 2
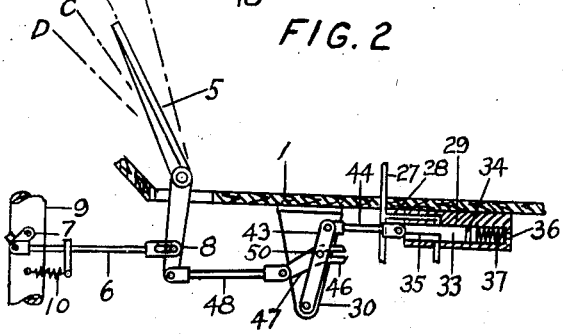
FIG. 3
FIG. 4
INVENTOR
Henry W. Struck
BY
Spear Rawlings & Spear
ATTORNEYS Patented May 14, 1940

2,200,973

UNITED STATES PATENT OFFICE 2,200,973

DEVICE FOR OPERATING VEHICLE CONTROLS

Henry W. Struck, Boston, Mass.

Application June 3, 1938, Serial No. 211,555

18 Claims. (Cl. 192—.01)

My present invention relates to a novel control for motor vehicles and the like.

While the general improvement of motor vehicles has included real improvements in such controls as brakes, clutches, and the like, the full advantage of such improvements can not be fully realized unless coordinated under one operator actuated control.

I am aware that several attempts have been made to utilize a single control to effect acceleration and the operation of the brakes and the clutch. None of these permitted the driver to enjoy the advantages of a single control because the operation of the brakes and the clutch was automatic even under conditions in which control by the operator was desirable.

Because the throttle is normally under the control of the operator and is automatically moved to a closed position, it is ideally adapted for use as a control for the brakes and the clutch. With the use of the accelerator as such a control permitting the brakes and the clutch to be actuated when the accelerator is released, an additional safety factor is insured since the time factor in brake application is eliminated and the possibility of serious accident, should the driver become incapacitated, are materially reduced.

As I have stated, I am aware that the return action of the accelerator as the means for actuating the brakes, disengaging the clutch or both has been proposed. These structures were not satisfactory because they were difficult to make and to install and because they involved an automatic operation not consistent with normal driving requirements, they were not adopted for use.

For example, the utility of the engine as an additional braking factor is commonly acknowledged and for that reason the use of a control common to the brakes and to the clutch presents a problem since the clutch should be disengaged only when the vehicle is practically stopped.

While an automatic release of the clutch may be effected at a predetermined engine speed, this basis of control is inadequate since at such a predetermined speed, whether the clutch should or should not be disengaged must depend on the will of the driver.

In accordance with my invention, I utilize any suitable power operated brake actuating a clutch releasing mechanism. Separate controls are used to connect each mechanism to the source of power and in my invention, the control for the brake actuating mechanism is connected to the accelerator by linkage which permits a predetermined limited movement of the accelerator without influencing the throttle valve actuating mechanism.

During the limited movement, the control for the brake actuating mechanism is moved into an inoperative position prior to the movement of the throttle valve actuating mechanism by the accelerator.

According to my invention, the control for the clutch disengaging mechanism must be operable by the driver automatically only at a predetermined speed. Its operation requires, furthermore, a constant force as contrasted to the requirements of braking where the force needed depends on the amount of braking effect needed under the then existing circumstances. For that reason, the control for the clutch operating mechanism is disposed in parallel with the control for the brake operating mechanism and is subject to being rendered operable by a centrifugal circuit closer only when the control for the brake actuating mechanism is operative. Thus, while the clutch becomes disengaged when the vehicle speed has sufficiently approached the idling speed of the engine it can become disengaged only if the operator has released the accelerator sufficiently to cause the brakes to be actuated. Regardless of the force utilized in brake application, the full force is always available to disengage the clutch.

Because the resistance of the spring used to actuate the control for the brake operating mechanism might, in some installations, become a factor in causing fatigue, I also provide a mechanism to maintain such a spring without effect on the accelerator when the throttle valve actuating mechanism is under the control of the accelerator. This mechanism is also desirable in that it permits the control to be subjected to a differentiated pressure against the operator's foot so that the operator may know the instant he has moved the accelerator into or out of the zone of limited movement during which control of the brakes and the clutch is effected.

In addition, my invention includes several other features which will be apparent from the accompanying specification.

In the drawing I have shown an embodiment of my invention from which its nature and its several advantages will be readily apparent. In the drawing:

Fig. 1 is a diagrammatic, partly sectioned view of a typical installation in relation to the conventional automobile operating and control mechanisms.

Fig. 2 is a partly sectioned, fragmentary view of the brake control and the accelerator connecting linkage with the parts in their position when the engine is driving the motor vehicle.

Fig. 3 is a view similar to Fig. 2 with the parts shown in their position when the accelerator is positioned for idling speed.

Fig. 4 is a section along the lines 4—4 of Fig. 1.

In Fig. 1 I have indicated such conventional automobile mechanisms and structures as the floor board 1, the transmission 2, the gear shift lever 3 and the battery 4. The accelerator pedal 5 and the linkage 6 by which the conventional throttle valve suggested at 7 is controlled by the operator, are conventional except that the linkage 6 has a slotted connection 8 with the accelerator 5 to permit a predetermined limited movement of the accelerator 5 without actuating the throttle valve 7. The intake manifold is indicated at 9. The spring 10 in control of the linkage 6 returns the throttle valve 7 to an idling position when the accelerator 5 is released by the operator.

The clutch pedal and a portion of its operating linkage are shown at 11 and 12, respectively, and at 13 I have indicated a portion of the brake operating linkage. Neither the brakes nor the clutch are shown, as these may be of any type. The conventional brake pedal is not shown since in accordance with my invention this may be omitted.

In accordance with my invention I use the accelerator 5 as the control for the brakes and the clutch so that the braking of a motor vehicle is facilitated since the accelerator is continually under the control of the operator. The operation of the brakes and the release of the clutch, as will subsequently be described, is effected by the accelerator 5 during the limited movement of the accelerator 5 during which the throttle valve 7 remains in idling position. The disengagement of the clutch cannot be effected, however, until the speed of the motor vehicle approaches the idling speed of the engine. Thus, on the release of the accelerator 5, the brakes are positively applied and the clutch release automatically effected in desired relation to all operating conditions with the automatic clutch disengagement possible only during application of the brakes.

It is essential that whatever control be used be adapted to return automatically to its closed position when released.

While any power medium may be employed to actuate the brakes and disengage the clutch, the power medium most readily available and adaptable in the most practical and simplest manner is vacuum, and the use of this power medium forms the basis of the description of my invention.

By virtue of the thermodynamic cycle on which the present day motor vehicle operates the motor draws in its own charge of explosive mixture for the power stroke, which, by inherent arrangement of its parts results in producing power for driving the vehicle and creates a vacuum in the motor gas intake manifold which supplies fuel to the various cylinders of the motor.

This source of power is utilized to actuate the conventional diaphragm units 14 and 15. The diaphragm unit 14 is connected to the brake operating link 13 by the rod 16.

If it is desired to avoid actuating the clutch pedal when the clutch is automatically disengaged, the clutch pedal 11 and the crank 17 may be independently mounted on the shaft 18 as shown in the drawing. The crank 17 has a pedal engaging dog 19. The diaphragm unit 15 is connected to the crank 17 by the rod 20 and the link 21 which has a slotted connection 22 with the crank 17. This structure permits the clutch to be manually actuated without unnecessarily moving the diaphragm and also permits the clutch to be automatically disengaged without moving the clutch pedal 11. The clutch pedal 11 is movably retained in position by the spring and its stop 23.

*The conduits and the controls therefor*

At 24 I have shown a vacuum storage tank connected to the intake manifold 9 by the conduit 25 in which I position a check valve 26 to maintain the vacuum in the tank 24 in the event the motor becomes stalled and the operation of the brakes and the clutch becomes necessary before the motor is again started. A conduit 27 from the tank 24 includes a branch conduit 28 under the control of the valve 29. The branch conduit 28 is in communication with the diaphragm unit 14 and the diaphragm unit 31.

The conduit 27 in communication with the diaphragm unit 15 is under the control of the valve 32.

The valve 29 includes a plunger 33 having a transverse passage 34 therethrough to connect the diaphragm units 14 and 31 to the tank 24. The plunger 33 is cut away as at 35 to permit the venting of the diaphragm units 14 and 31 to the atmosphere. The valve 29 is vented to atmosphere at 36. A spring 37 urges the plunger 33 into a position wherein the diaphragm units 14 and 31 may be operated by the vacuum.

The valve 32 includes a plunger 38 having a transverse bore 39 to permit the vacuum in the tank 24 to be effective to operate the diaphragm unit 15. The plunger 38 is cut away as at 39a to permit the venting of the diaphragm unit 15 to atmosphere through the port 40 in the valve 32. The plunger 38 is normally held in a position to close the conduit 27 by the valve spring 41. The valve 32 is vented to atmosphere as at 42.

*The manually operable control mechanism*

At 30 I have shown a support carried by the floor board 1, or any other suitable vehicle member. A lever 43 is pivotally mounted on the support 30 and is connected to the valve plunger 33 by a link 44. At 45 I have shown a pivot preferably of the roller type on the support 30 which lies within the forked end 46 of the crank 47 pivotally connected to the accelerator 5 by the link 48. The crank 47 includes a boss 49 over the inner end of the slot presented by the forked end 46 and the crank 47 and the lever 43 are pivotally interconnected as at 50 through the boss 49.

As shown from a comparison of Figs. 1, 2 and 3 the movement of the accelerator from the position A to the position B is without effect on the throttle valve 7. During this limited movement the forked end 46 of the crank 47 is in a position wherein the lever 43 may pivot from the position shown in Fig. 3 to the position shown in Fig. 1 under the influence of the spring 37. Movement of the accelerator from position A to B results in a thrust of the crank 47 and of the lever 43 to the right until stopped by the pivot 45, the valve 29 then being closed. The pivotal interconnection 50 is then concentric with the support pivot 45 and further movement of the crank 47 beyond the position B of the accelerator 5 results in its pivoting around the pivot 45. The crank 47 may thus be held without influence of the spring 37 on the accelerator 5 since the pivot 45 retains the forked portion 46 of the crank 47. Further movement of the accelerator 5 from the position B towards the position C, for example, effects partial rotation of the crank 47 around the pivot 45.

When the accelerator 5 is released by the operator it is returned towards the position A by the spring 10. When in the position B the crank 47 is positioned as shown in Fig. 3 so that the pivot 45 no longer prevents movement of the lever 43 but permits the spring 37 to actuate the lever 43 and to move the lever 43 and the crank 47 into the position shown in Fig. 1, wherein the valve 29 permits the brakes to be actuated.

The use of the mechanism just described is preferred since it permits the use of a spring 37 of sufficient strength to require noticeably increased effort by the operator to overcome it. Thus during the movement of the accelerator from the position A to the position B, a noticeably greater effort is required by the operator than is required during movement of the accelerator from position B to position D so that the driver may accurately know whether the accelerator 5 is in control of the throttle valve 7 or in control of the brakes.

The automatic control mechanism

In accordance with my invention the clutch is automatically disengaged only when the driver wishes to bring the vehicle to a halt and it is then disengaged only when the speed of the motor vehicle approaches the idling speed of the engine in order that the engine may be utilized to its maximum advantage as a braking factor.

As the simplest form of control of the valve 32 I have shown a solenoid 51 adapted to be energized by the battery 4 under certain conditions. The circuit (see Fig. 1) from the battery 4 includes in series the conventional ignition switch 52, a switch 53 open only when the transmission is in neutral position and a switch 54 closed only when the diaphragm unit 31 is connected to the tank 24.

The switch 53 includes a forked crank 58 of suitable non-conductive material pivotally mounted in desired relation to the gear shift lever 3 which has a pin 56 with which the fork engages. I have shown a switch box 57 having two spaced contacts 59 with which contact is made by the arm 60 of the crank 58 whenever the transmission gears are in any of their speed positions.

The switch 54 includes contacts 61 adapted to be closed by the switch bar 54 connected by the rod 55 to the diaphragm in the diaphragm unit 31, a spring 62 between the diaphragm unit 31 and the switch 54 opposing the action of the diaphragm.

To complete the circuit to the solenoid 51, I utilize a centrifugal circuit closer responsive to the speed of the vehicle. The centrifugal circuit closer comprises a casing 63 having a shaft 64 driven by suitable gearing 65 driven by the conventional speedometer drive. The speedometer flexible shafting is indicated at 66. The shaft 64 includes a fixed collar 67 and a slidable collar 68 between which there is a compression spring 69. Weighted arms 70 mounted on the collar 67 are connected by links 71 to the slidable collar 68. At 72 I have shown an insulated contact extending through the casing 63, with which contact is made by the slidable collar 68 when the vehicle speed has sufficiently approached the idling speed of the engine so that the centrifugal effect of the weighted arms 70 is no longer effective to overcome the resistance of the spring 69. The casing 63 is grounded as at 73.

Actuating of the control valve 32 for the clutch may be effected as desired as long as its operation is determined by the vehicle speed and by the inoperative position of an operator actuated control for use in maintaining the vehicle in motion.

Operation

My invention may be most clearly understood by consideration of its operation.

Assuming that the motor vehicle is at rest, the engine idling and the gear shift lever 3 in neutral position, the switch 52 is then closed but the switch 53 is open. The clutch is therefore engaged as it is whenever the circuit to the solenoid is broken. The driver now disengages the clutch, places the gear shift lever 3 in proper position and releases the clutch while actuating the accelerator 5 in the well known manner. This carries the accelerator 5 from its position A to a desired position intermediate the positions B and D. The valve 29 is thereby closed and the resistance of its spring 37 is no longer opposing the driver. As long as the accelerator 5 remains intermediate positions B and D, the valve 29 remains closed so that the switch 54 is never closed regardless of the vehicle speed and the operation of the motor vehicle is conventional.

Assuming that the operator desires to retard the vehicle speed, he releases the accelerator 5 to a position intermediate the positions A and B thereby permitting the spring 37 to actuate the valve 29. While the switch 54 is thereby closed automatically, disengagement of clutch automatically is impossible until the vehicle speed has been sufficiently retarded to permit the centrifugally controlled circuit closer to operate.

If the driver desires to stop the motor vehicle, continued application of the brakes results in a sufficiently decreased vehicle speed to permit the centrifugally controlled circuit closer to complete the circuit and to energize the solenoid 51.

The clutch may at all times be manually operated. Indeed, the normal use by the driver of the conventional clutch control is in no way interfered with by my invention. For example, automatic disengagement of the clutch may be prevented by placing the gear shift lever 3 in neutral position or, if the driver wishes to leave the car in gear, he may do so since the circuit to the solenoid 51 is broken when the ignition switch 52 is turned to an off position.

My invention may be readily incorporated in motor vehicles having an automatic transmission. The only change in my invention as described is in the switch 53 which in automatic transmission must be varied to be actuated by the automatic control effecting a connection between the shafts.

It is to be understood that my invention does not in any way effect the conventional emergency or parking brake as the purpose of my invention is to coordinate the normal driving mechanism under one control.

What I therefore claim and desire to secure by Letters Patent is:

1. In a motor vehicle control system having a throttle actuating member, brakes, a clutch, power operable means to operate said brakes and power operable means to operate said clutch, a source of power, means to connect said source and both of said power operable means, said means comprising a first control for said brake operating means and a second control for said clutch operating means, an operator control, means connecting said operator control to said throttle actuating member to permit limited movement of said operator control independently of said member, means connecting said first control to said operator control to permit said first control to be actuated during said limited movement prior to movement of said throttle actuating member, means resiliently urging said operator control to a position wherein said first control is fully operative, and means to operate said second named control, said last named means comprising means to operate when said first control is in an operative position and means responsive to the vehicle speed.

2. In a motor vehicle control system having a throttle actuating member, brakes, a clutch and a clutch pedal, power operable means to operate said brakes and power operable means to operate said clutch, a source of power, means to connect said source and both of said power operable means, said means comprising a first control for said brake operating means and a second control for said clutch operating means, an operator control, means connecting said operator control to said throttle actuating member to permit limited movement of said operator control independently of said member, means connecting said clutch pedal to said clutch operating means to permit manual operation of said clutch without affecting said clutch operating means, means connecting said first control to said operator control to permit said first control to be moved to an inoperative position during said limited movement prior to movement of said throttle actuating member, means resiliently urging said operator control to a position wherein said first control is fully operative, and means to operate said second named control, said last named means comprising means to operate when said first control is in an operative position, and means responsive to the vehicle speed.

3. In a motor vehicle control system having a throttle actuating member, brakes and a clutch, power operable means to operate said brake and power operable means to operate said clutch, a source of power, a conduit from said source in communication with each of said means, a valve in said conduit controlling said brake operating means, a second valve in said conduit controlling said clutch operating means, an operator control, means connecting said operator control to said throttle actuating member to permit limited movement of said operator control independently of said member, means connecting said first valve to said operator control to permit said first valve to be closed during said limited movement prior to movement of said throttle actuating member, means resiliently urging said operator control to a position wherein said first valve is fully open, and means responsive to the vehicle speed to open said second-named valve at a predetermined speed and when said first valve is open.

4. In a motor vehicle control system having a self-closing throttle actuating member and brakes, power operable means to operate said brake, a source of power, a control to connect said brake operating means to said source, an operator control, said actuating member being connected to said operator control to permit limited movement thereof without movement of said member, means urging said control to an operative position, means connecting said control to said operator control to permit its movement into operative position during said limited movement of said operator control and to maintain said control in inoperative position and without effect of said means urging said control to an operative position on said operator control during movement of said actuating member.

5. In a motor vehicle control system having a throttle actuating member, a spring urging said member in one direction and brakes and a clutch, power operable means to operate said brake and power operable means to operate said clutch, a source of power, a control to connect said brake operating means to said source, a second control to connect said clutch operating means to said source, an operator control, said actuating member being connected to said operator control to permit limited movement thereof without movement of said member, a spring urging said first control to an operative position, means connecting said first control to said operator control to permit its movement into operative position during said limited movement of said operator control and to maintain said first control in inoperative position and without tension of said second-named spring on said operator control during movement of said actuating member and means responsive to the vehicle speed to operate said second-named control at a predetermined speed and when said first control is in an operative position.

6. In a motor vehicle control system having a throttle actuating member, brakes and a clutch, power operable means to operate said brakes and power operable means to operate said clutch, a source of power, a control to connect said brake operating means to said source, a second control to connect said clutch operating means and said source, an operator control, means connecting said operator control to said throttle actuating member to permit limited movement of said operator control independently of said member, means connecting said first control to said operator control to permit said first control to be moved to an inoperative position during said limited movement prior to movement of said throttle actuating member, means resiliently urging said operator control to a position wherein said first control is fully operative, and means to operate said second control at a predetermined vehicle speed, said last-named means including a solenoid to operate said second control and an electric circuit inclusive of said solenoid, a governor responsive to the vehicle speed and a switch in said circuit operable by said governor to close said circuit at a predetermined speed.

7. In a motor vehicle control system having a throttle actuating member, brakes, and a clutch, power operable means to operate said brakes and power operable means to operate said clutch, a source of power, a first control to connect said brake operating means to said source, a second control to connect said clutch operating means to said source, an operator control, means connecting said operator control to said throttle actuating member to permit limited movement of said operator control independently of said member, means connecting said first control to said operator control to permit said first control to be moved to an inoperative position during said limited movement prior to movement of said throttle actuating manner, means resiliently urging said operator control to a position wherein said control is fully operative and means to operate said second control at a predetermined vehicle speed and means to render said last-named means inoperative when said brake operating means is inoperative.

8. In a motor vehicle control system having a throttle actuating member, brakes, and a clutch, power operable means to operate said brakes and power operable means to operate said clutch, a source of power, a first control to connect said brake operating means to said source, a second control to connect said clutch operating means to said source, an operator control, means connecting said operator control to said throttle actuating member to permit limited movement of said operator control independently of said member, means connecting said first control to said operator control to permit said first control to be moved to an inoperative position prior to movement of said throttle actuating member, means resiliently urging said operator control to a position wherein said first control is fully operative, and electrical means to operate said second control, and a pair of switches for said last-named means, one of said switches being closed when said first control is operative and the other of said switches being closed at a predetermined vehicle speed.

9. In a motor vehicle control system having a throttle actuating member, brakes, and a clutch, power operable means to operate said brakes and power operable means to operate said clutch, a source of power, a first control to connect said brake operating means to said source, a second control to connect said clutch operating means to said source, an operator control, means connecting said operator control to said throttle actuating member to permit limited movement of said operator control independently of said member, means connecting said first control to said operator control to permit said first control to be moved to an inoperative position prior to movement of said throttle actuating member, means resiliently urging said operator control to a position wherein said first control is fully operative, and electrical means to operate said second control, and a pair of switches for said last-named means, a pressure operable means to close one of said switches, said pressure operable means being operably connected to said source when said first control is operative and means responsive to the vehicle speed to close the other of said switches.

10. In a motor vehicle control system having a throttle actuating member, brakes and a clutch and a transmission, power operable means to operate said brakes and power operable means to operate said clutch, a source of power, a control to connect said brake operating means to said source, a second control to connect said clutch operating means and said source, an operator control, means connecting said operator control to said throttle actuating member to permit limited movement of said operator control independently of said member, means connecting said first control to said operator control to permit said first control to be moved to an inoperative position during said limited movement prior to movement of said throttle actuating member, means resiliently urging said operator control to a position wherein said first control is fully operative, and means to operate said second control at a predetermined vehicle speed and means to render said last-named means inoperative when said transmission is neutrally positioned.

11. In a motor vehicle control system having a throttle actuating member, brakes and a clutch and a transmission, power operable means to operate said brakes and power operable means to operate said clutch, a source of power, a control to connect said brake operating means to said source, a second control to connect said clutch operating means and said source, an operator control, means connecting said operator control to said throttle actuating member to permit limited movement of said operator control independently of said member, means connecting said first control to said operator control to permit said first control to be moved to an inoperative position during said limited movement prior to movement of said throttle actuating member, means resiliently urging said operator control to a position wherein said first control is fully operative, and means to operate said second control at a predetermined vehicle speed, said last-named means including a solenoid to operate said second control and an electric circuit inclusive of said solenoid, a governor responsive to the vehicle speed, a switch in said circuit operable by said governor to close said circuit at a predetermined speed and a second switch in said circuit adapted to be closed when said transmission is positioned for vehicle movement.

12. In a control system for a motor vehicle having a transmission, brakes and a clutch, a self-closing throttle actuating member and an electric circuit having a lock controlled switch, power operable means to operate said brakes and power operable means to operate said clutch, a source of power, a control to connect said brake operating means to said source, a second control to connect said clutch operating means to said source, an operator control, means connecting said operator control to said throttle actuating member to permit limited movement of said operator control independently of said throttle actuating member, and means connecting said first control to said operator control to permit operation of said first control during said limited movement, and electrical means to operate said second control at a predetermined vehicle speed, and means to render said last-named means inoperative when said transmission is neutrally positioned or when said switch is locked.

13. In a control system for a motor vehicle having a transmission, a clutch, a self-closing throttle actuating member, power operable means to operate said clutch, a source of power, a control to connect said means to said source, an operator control, means connecting said operator control to said throttle actuating member to permit limited movement of said operator control independently of said throttle actuating member, control operating means, means connecting said control operating means to said operator control for operation during said limited movement, an electric circuit having a lock controlled switch, said circuit including a triplicate of switches, pressure operable means to close one of said switches when said operator controlled means is in an operative position, means responsive to the vehicle speed to close another of said switches at a predetermined speed, and transmission control means to close the other of said switches except when said transmission is neutrally positioned.

14. In a motor vehicle control having a throttle actuating member, an operator control, means connecting said operator control to said member to permit limited movement of said operator control independently of said member, a resilient member opposing movement of said actuating member by said operator control, a second control, means connecting said second control to said operator control, and a resilient member urging said second control to an operative position and said means being adapted to render said last-named resilient member inoperative during movement of said actuating member by said operator control.

15. In a motor vehicle control having a throttle actuating member, an operator control, means connecting said operator control to said member to permit limited movement of said operator control independently of said member, a resilient member opposing movement of said actuating member by said operator control, a second control, means connecting said second control to said operator control, and a resilient member urging said second control to an operative position, said means being adapted to render said last-named resilient member inoperative during movement of said actuating member by said operator control and said last-named resilient member being of sufficient strength to require noticeably increased effort by the operator to overcome its resistance as compared with the effort required to overcome the resistance of said first named resilient member.

16. In a motor vehicle control having a self-closing throttle actuating member, an operator control, means connecting said control to said member to permit limited movement of said control independently of said member, a control, means urging said control into an operative position, and means connecting said control to said operator control to permit its movement into operative position during said limited movement of said operator control and to maintain said control in an inoperative position without effect of said means urging said control to an operative position on said operator control during movement of said actuating member.

17. In a motor vehicle control having a self-closing throttle actuating member, a spring urging said member in one direction, an operator control, means connecting said control to said member to permit limited movement of said control independently of said member, a control, a spring urging said control into an operative position, and means connecting said control to said operator control to permit its movement into operative position during said limited movement of said operator control and to maintain said control in an inoperative position without the tension of said second-named spring on said operator control during movement of said actuating member, said last-named means including a support, a pivot on said support, a crank, a lever, means pivotally interconnecting said crank and said lever, said crank having a pivot engaging slot to permit said interconnecting means to be moved into and out of registry with said pivot, and means connecting said crank to said operator control so that said interconnecting means are positioned in registry with said pivot during movement of said member by said operator control and said interconnecting means are movable by said second-named spring during said limited movement.

18. In a vehicle control system having a self-closing throttle actuating member and brakes and a clutch, power operable means to operate said brakes and power operable means to operate said clutch, a source of power, means to connect said source to said power operable means, said means comprising a first control for said brake operating means and a second control for said clutch operating means, a resilient member urging said control for said brake operating means into an operative position, an operator control, means connecting said operator control to said throttle actuating member to permit limited movement of said operator control without actuating said member, means connecting said first control to said operator control to permit its movement into operative position during said limited movement of said operator control and to maintain said first control in an inoperative position and without tension of said resilient member on said operator control during movement of said actuating member, said last-named means comprising a support, a pivot on said support, a link pivotally connected to said operator control, a crank pivotally connected to said link, said crank having at its other end a slot for slidable engagement with said pivot, a lever pivotally mounted on said support, a link pivotally connecting said control and said lever, means pivotally interconnecting said lever and said crank over the inner end of said slot, said crank being positioned when said throttle actuating member is under the influence of said operator control so that said interconnecting means is coaxial with said pivot and said lever restrained against movement by said resilient member by said slot and during said limited movement of said operator control said crank slot is positioned so that said slot permits said crank to move under the influence of said resilient member.

HENRY W. STRUCK.